United States Patent
O'Clair

(10) Patent No.: US 7,698,059 B2
(45) Date of Patent: *Apr. 13, 2010

(54) USING BOUNDARIES ASSOCIATED WITH A MAP VIEW FOR BUSINESS LOCATION SEARCHING

(75) Inventor: Brian O'Clair, New York, NY (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/059,548

(22) Filed: Mar. 31, 2008

(65) Prior Publication Data

US 2008/0183377 A1 Jul. 31, 2008

Related U.S. Application Data

(63) Continuation of application No. 11/139,032, filed on May 27, 2005, now Pat. No. 7,373,246.

(51) Int. Cl.
G01C 21/32 (2006.01)

(52) U.S. Cl. ................................ 701/208; 701/200

(58) Field of Classification Search ................ None
See application file for complete search history.

(56) References Cited

U.S. PATENT DOCUMENTS

| | | | |
|---|---|---|---|
| 4,974,170 A | | 11/1990 | Bouve et al. |
| 5,289,572 A | | 2/1994 | Yano et al. |
| 5,852,810 A | | 12/1998 | Sotiroff et al. |
| 5,944,769 A | * | 8/1999 | Musk et al. .............. 701/201 |
| 6,408,307 B1 | * | 6/2002 | Semple et al. ........... 707/104.1 |
| 6,701,307 B2 | | 3/2004 | Himmelstein et al. |
| 6,718,344 B2 | | 4/2004 | Hirono |
| 6,775,613 B2 | | 8/2004 | Burt et al. |
| 7,231,405 B2 | | 6/2007 | Xia |
| 7,373,246 B2 | | 5/2008 | O'Clair |
| 2002/0042819 A1 | | 4/2002 | Reichert et al. |
| 2002/0078035 A1 | | 6/2002 | Frank et al. |
| 2002/0143462 A1 | | 10/2002 | Warren |
| 2002/0156779 A1 | | 10/2002 | Elliot et al. |
| 2002/0163547 A1 | | 11/2002 | Abramson et al. |

FOREIGN PATENT DOCUMENTS

| | | | |
|---|---|---|---|
| EP | 1072987 A1 | * | 1/2001 |
| WO | WO 01/65410 A2 | | 9/2001 |
| WO | WO 02/065331 A2 | | 8/2002 |

OTHER PUBLICATIONS

U.S. Appl. No. 11/138,670, filed May 27, 2005 entitled "Scoring Local Search Results Based On Location Prominence" by Brian O'Clair et al., 46 pages.

* cited by examiner

Primary Examiner—Michael J. Zanelli
(74) Attorney, Agent, or Firm—Harrity & Harrity, LLP

(57) ABSTRACT

A system aggregates entity location information from multiple documents distributed among multiple locations in a network. The system searches the entity location information to identify a first set of entities located within the entirety of a first geographic region selected by a user. The system provides a first digital map to the user via a network, the first digital map including the first geographic region and further including visual representations of the first set of identified entities and their associated geographic locations.

20 Claims, 7 Drawing Sheets

USING BOUNDARIES ASSOCIATED WITH A MAP VIEW FOR BUSINESS LOCATION SEARCHING

This application is a continuation of U.S. application Ser. No. 11/139,032, filed May 27, 2005, the disclosure of which is incorporated herein by reference.

BACKGROUND

1. Field of the Invention

Implementations described herein relate generally to information retrieval and, more particularly, to using boundaries associated with a given map view for retrieving the location of businesses located within the boundaries of the map view.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages (e.g., using an index). Web pages that contain the user's search terms are considered "hits" and are returned to the user as links.

Local search engines are search engines that attempt to return relevant web pages and/or business listings within a certain distance of a specific geographic location. For a local search, a user may enter a search query and may specify a geographic location around which the search query is to be performed. The local search engine may return relevant results, such as relevant web pages pertaining to the geographic area or listings of businesses that are located within a certain distance of a center of the specified geographic location. For example, if one searches for restaurants in the San Francisco Bay area using an existing graphical map search interface (e.g., a local search using Google Maps) only the most relevant restaurants within a certain distance of the very center point of the map will be provided to the searching user. The searching user, however, may find it more desirable to locate the most relevant restaurants over the entire area of the map displayed to the user, and not just those within a certain distance of the center point of the map.

SUMMARY

According to one aspect, a computer-implemented method may include providing a first map to a user, the first map including a geographic region having first boundaries. The method may further include receiving an indication of a boundary reselection from the user and providing a second map to the user, the second map including a geographic region having second boundaries, where the second boundaries are different than the first boundaries. The method may also include identifying a geographic search area based on the second boundaries, searching location information to identify entities located within the identified geographic search area, and providing the identified entities, and associated geographic location information, to the user.

According to another aspect, a method may include aggregating entity location information from a group of documents distributed among a group of locations in a network and searching the entity location information to identify a first set of entities located within the entirety of a first geographic region selected by a user. The method may further include providing a first digital map to the user via the network, the first digital map covering the first geographic region and including visual representations of the first set of identified entities and their associated geographic locations.

According to a further aspect, a computer-implemented method may include defining a first geographic region associated with a digital map based on first user input. The method may further include searching business location information to identify businesses located within the entirety of the first geographic region.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Consistent with aspects of the invention, entities (e.g., businesses) that are the most relevant to a given search query and that are located within an entire area of a map view presented to the user, and not just those within a certain distance from the center point of the map view, may be provided to a searching user. A broad area defined by the outer boundaries of a map view, the extent of which may be changed by the user, may, thus, be used to search a corpus of location listings (e.g., business location listings, residential location listings, government office location listings, etc.) that may have been aggregated from multiple documents hosted at multiple distributed locations in a network.

A "document," as the term is used herein, is to be broadly interpreted to include any machine-readable and machine-storable work product. A document may include, for example, an e-mail, a web site, a business listing, a file, a combination of files, one or more files with embedded links to other files, a news group posting, a blog, a web advertisement, a digital map, etc. In the context of the Internet, a common document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Overview

Figure 1:
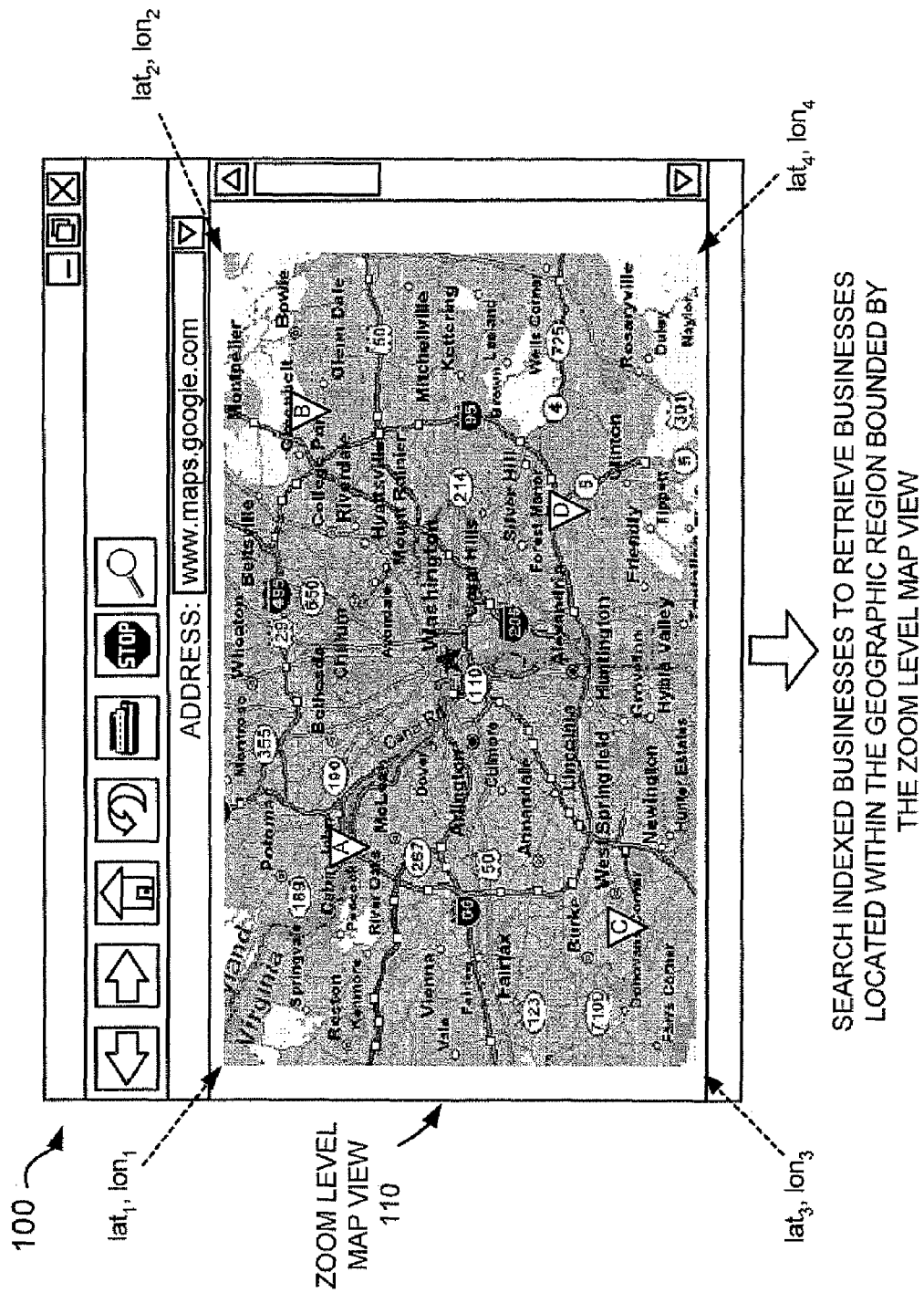
FIG. 1 is an exemplary diagram of an overview of an implementation of the invention in which a zoom level map view of a geographic region is used to retrieve a listing of businesses located within the geographic region.

FIG. 1 illustrates an exemplary overview of an implementation of the invention in which different zoom level views of a map document may be used to define a geographic region that may further be used to identify businesses that are located within the boundaries of the geographic region. As shown in FIG. 1, a server (not shown) may provide a map document 100 to a user at a client (not shown) in response to a geographic location provided by the user. Map document 100 may include a zoom level view 110 of the geographic location provided by the user. The user may additionally provide a search query related to a type of business that the user desires to locate within a geographic region bounded by zoom level view 110 of the map document. The user may "move" north, south, east or west with respect to zoom level view 110 of the map document, or may change the scale of zoom level view 110 by "zooming in" or "zooming out" of the zoom level view 110. With each view change by the user, the server may provide an updated zoom level view 110 of the map document that corresponds to the change in scale, or to the direction the user has moved with respect to the previous view. As shown in FIG. 1, zoom level view 110 may have boundaries that encompass a specific geographic region at a specific scale.

Once the user has obtained the desired geographic region, at the desired scale, of the map document, the user may initiate a search of businesses located within the desired geographic region. The server may search a database of businesses, along with associated business location information and business contact information, that has been produced by fetching and aggregating multiple documents hosted at multiple distributed locations in a network. Business location information derived from the aggregated documents may be indexed, and this index may be searched to retrieve businesses that are located within the boundaries of the entirety of zoom level map view 110 selected by the user. For example, as shown in FIG. 1, a latitude (lat) and longitude (lon) may be determined to be associated with each of the boundaries (e.g., each corner when the map is rectangular) of zoom level map view 110. The index may be searched to retrieve businesses that have corresponding latitude and longitude location information located within the entirety of the geographic region bounded by zoom level map view 110.

Exemplary Network Configuration

Figure 2:
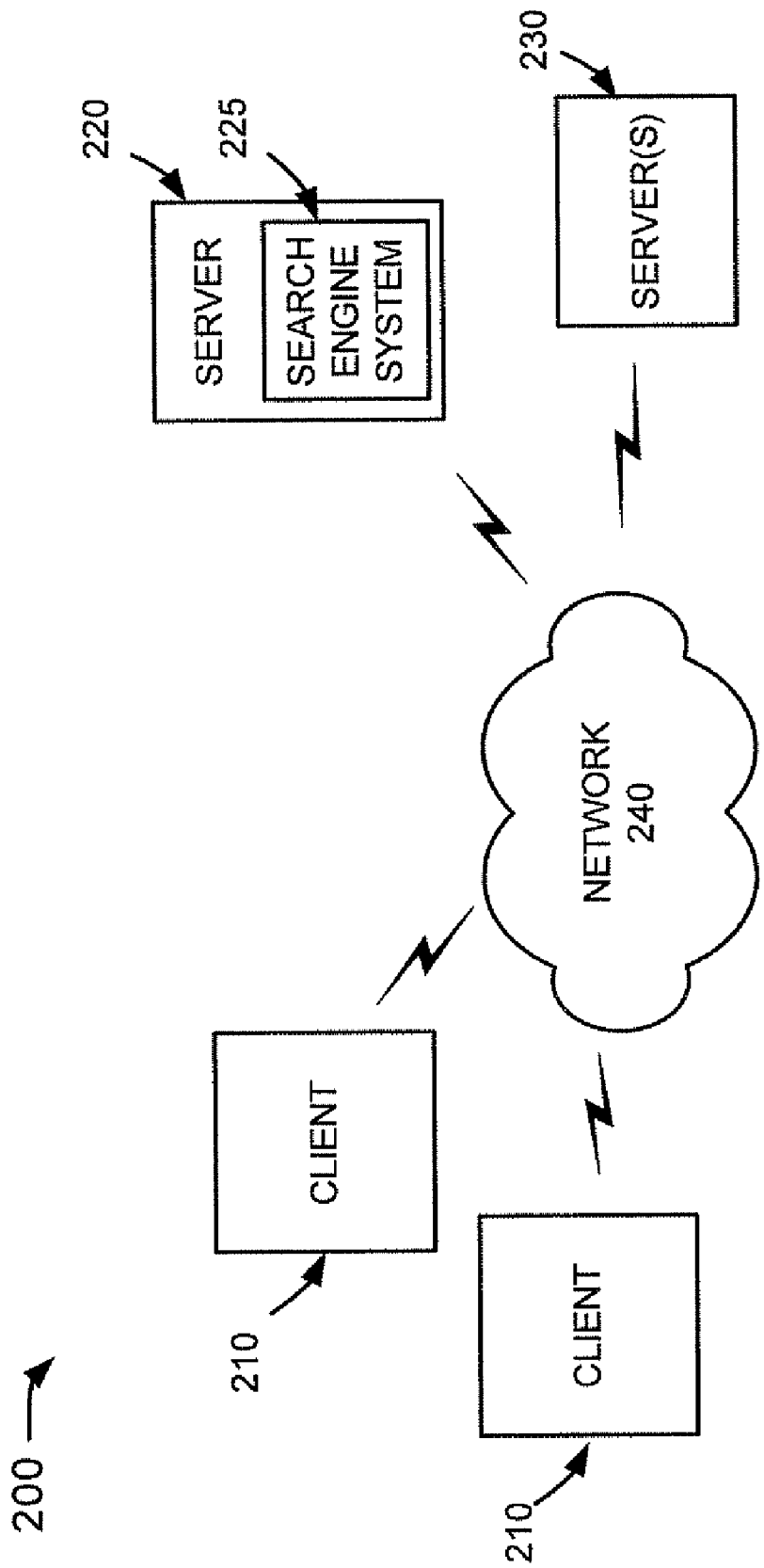
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to one or more servers 220-230 via a network 240. Two clients 210 and two servers 220-230 have been illustrated as connected to network 240 for simplicity. In practice, there may be more or fewer clients and servers. Also, in some instances, a client may perform some functions of a server and a server may perform some functions of a client.

Clients 210 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Servers 220 and 230 may include server entities that access, fetch, aggregate, process, search, and/or maintain documents in a manner consistent with the principles of the invention. Clients 210 and servers 220 and 230 may connect to network 240 via wired, wireless, and/or optical connections.

In an implementation consistent with the principles of the invention, server 220 may include a search engine system 225 usable by users at clients 210. Server 220 may implement a data aggregation service by crawling a corpus of documents (e.g., web documents), indexing entity location information (e.g., business locations) extracted from the documents, and storing the entity location information associated with the documents in a repository. The data aggregation service may be implemented in other ways, such as by agreement with the operator(s) of data server(s) 230 to distribute content from their hosted documents via the data aggregation service. Search engine 225 may execute a query, received from a user at a client 210, on the entity location information stored in the repository and may provide a graphical digital map based on the executed query.

Server(s) 230 may store or maintain documents that may be crawled by server 220. Such documents may include geographic location data associated with businesses. For example, a document associated with the site starbucks.com may include address and contact information (e.g., telephone number) of Starbucks coffee shops. The documents stored by server(s) 230 may further include geographic location data associated with other entities, such as residences of private individuals, addresses and contact information associated with government offices, etc.

Network 240 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks. The PLMN(s) may further include a packet-switched sub-network, such as, for example, General Packet Radio Service (GPRS), Cellular Digital Packet Data (CDPD), or Mobile IP sub-network.

While servers 220-230 are shown as separate entities, it may be possible for one of servers 220-230 to perform one or more of the functions of the other one of servers 220-230. For example, it may be possible that servers 220 and 230 are implemented as a single server. It may also be possible for a single one of servers 220 and 230 to be implemented as two or more separate (and possibly distributed) devices.

Exemplary Client/Server Architecture

Figure 3:
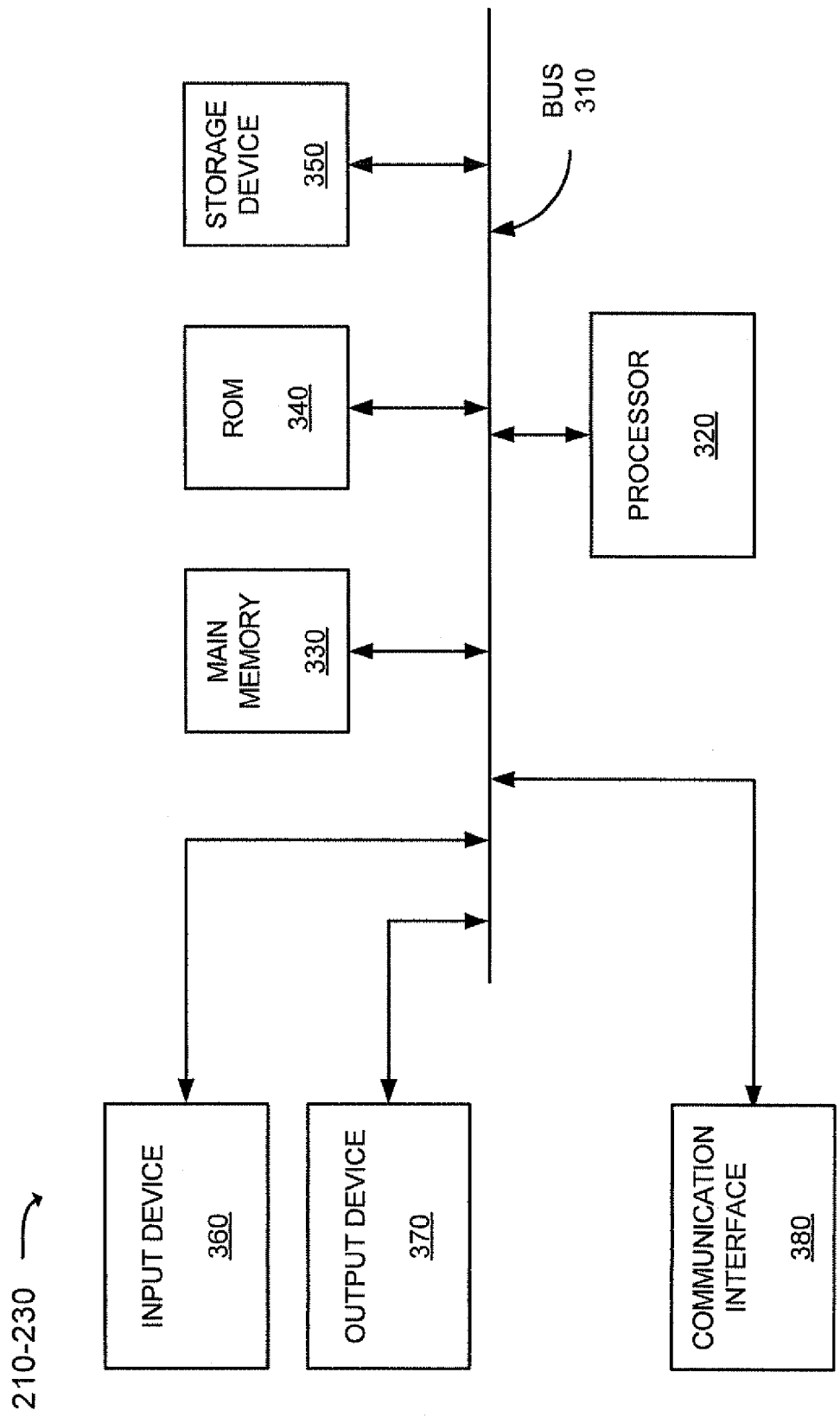
FIG. 3 is an exemplary diagram of a client or server of FIG. 2 according to an implementation consistent with the principles of the invention.

FIG. 3 is an exemplary diagram of a client or server entity (hereinafter called "client/server entity"), which may correspond to one or more of clients 210 and/or servers 220-230, according to an implementation consistent with the principles of the invention. The client/server entity may include a bus 310, a processor 320; a main memory 330, a read only memory (ROM) 340, a storage device 350, an input device 360, an output device 370, and a communication interface 380. Bus 310 may include a path that permits communication among the elements of the client/server entity.

Processor 320 may include a conventional processor, microprocessor, or processing logic that may interpret and execute instructions. Main memory 330 may include a random access memory (RAM) or another type of dynamic storage device that may store information and instructions for execution by processor 320. ROM 340 may include a conventional ROM device or another type of static storage device that may store static information and instructions for use by processor 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 240.

The client/server entity, consistent with the principles of the invention, may perform certain operations or processes, as will be described in detail below. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform operations or processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Process for Indexing Business Location Information

Figure 4:
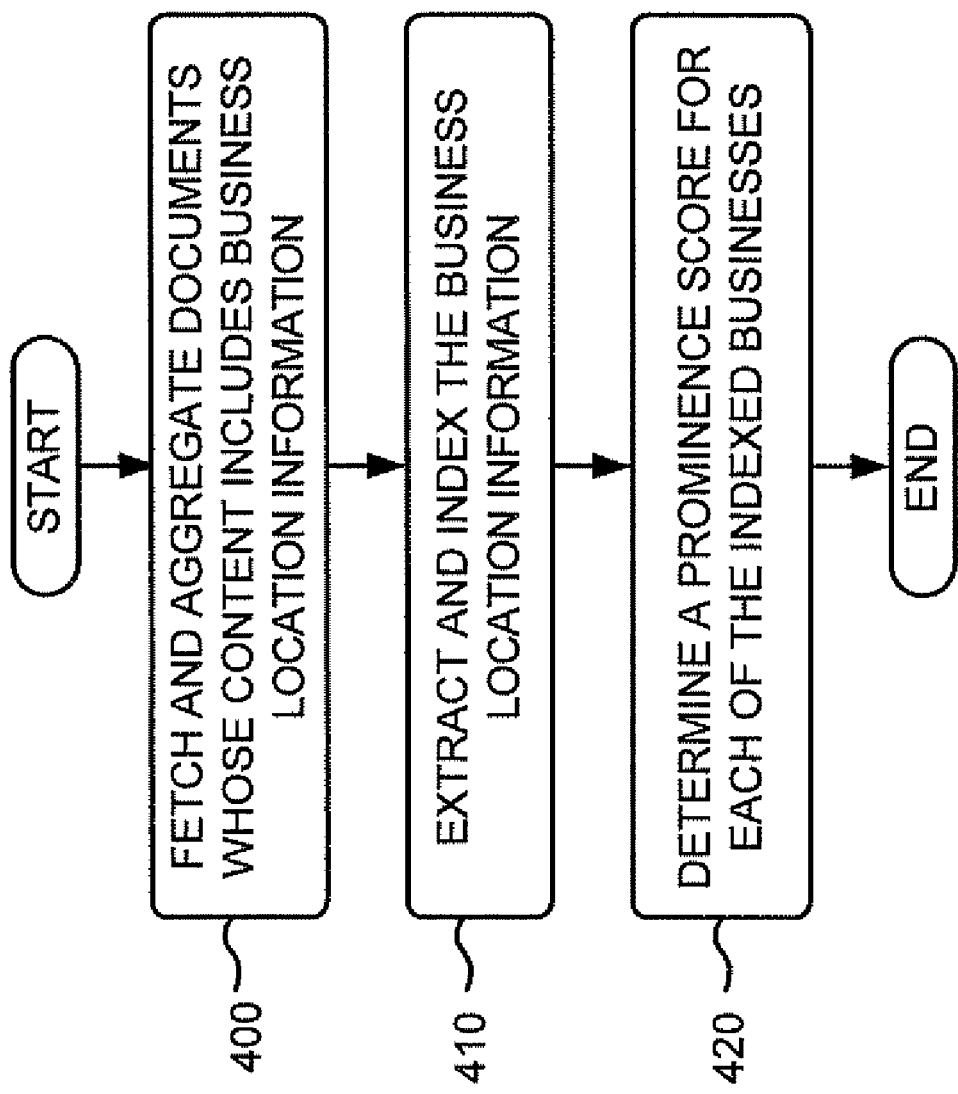
FIG. 4 is a flowchart of an exemplary process for fetching, aggregating and indexing business location information contained in distributed documents according to an implementation consistent with the principles of the invention.

FIG. 4 is a flowchart of an exemplary process for fetching, aggregating and indexing business location information extracted from multiple documents that may be hosted at distributed locations in a network. As one skilled in the art will appreciate, the process exemplified by FIG. 4 can be implemented in software and stored on a computer-readable memory, such as main memory 330, ROM 340, or storage device 350 of server 220.

The exemplary process may begin with fetching and aggregating documents whose content includes business location information (block 400). The business location information may, for example, include a name, an address and contact information associated with one or more specific businesses. The business location information may also include a latitude and longitude associated with the address of the business. The documents that are fetched and aggregated may include authoritative documents the content of which are considered highly accurate or trustworthy. For example, documents associated with the "yellow pages" may be fetched and aggregated to extract address information associated with businesses. The address information may, in turn, be translated to geographic latitude and longitude information.

The business location information for each business contained in the aggregated documents may be indexed (block 410). Existing techniques may be used to index the business location information so that the business location information can be efficiently searched.

A prominence score associated with each indexed business may be determined (optional block 420). The prominence score may be used in ranking businesses returned as results of a search. In one implementation, the scoring techniques described in co-pending U.S. application Ser. No. 11/138,670, entitled "Scoring Local Search Results Based on Location Prominence," the disclosure of which is incorporated by reference herein, may be used to score each indexed business.

Exemplary Zoom Level Map View Business Location Identification Process

Figure 5:
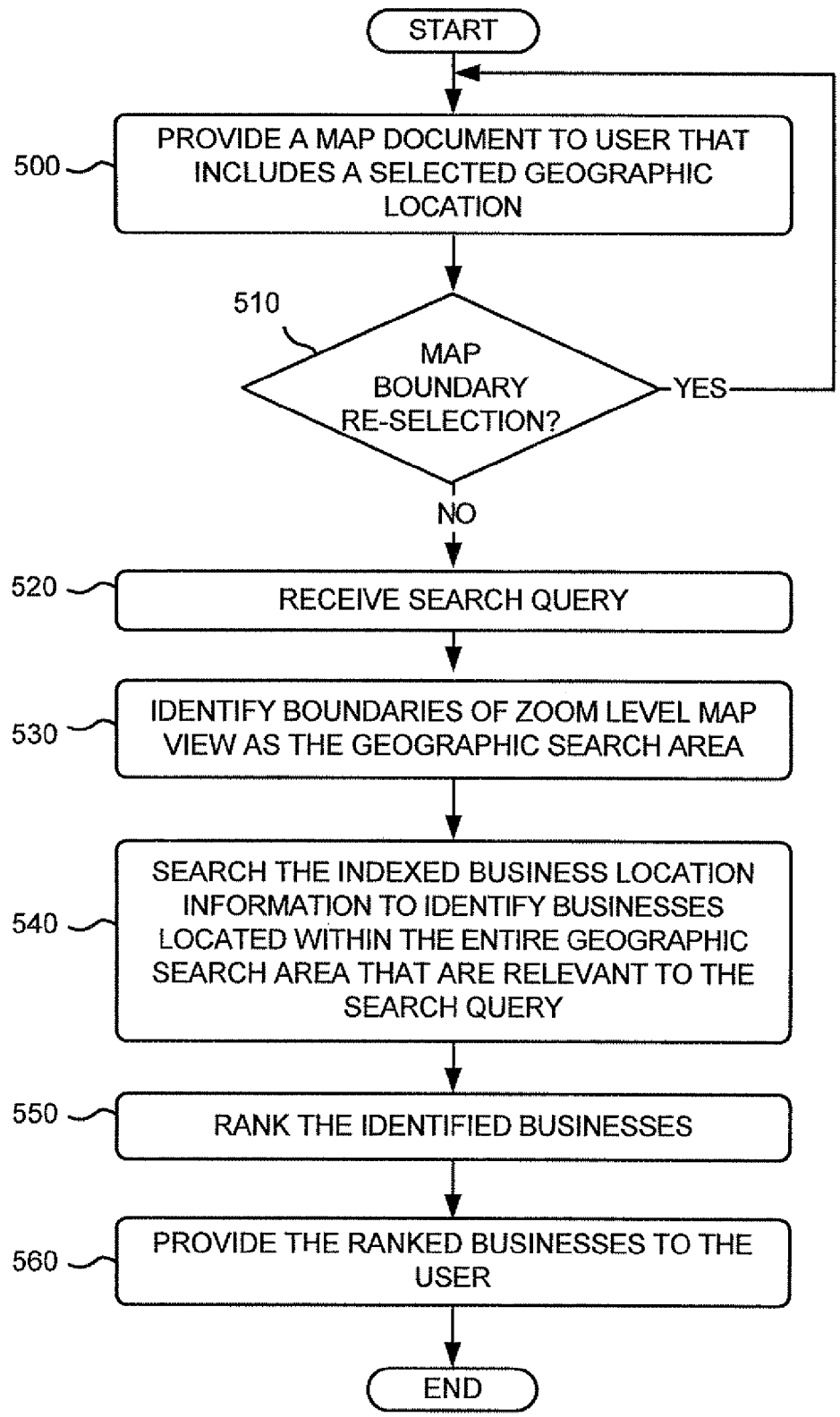
FIG. 5 is a flowchart of an exemplary process for identifying the location of one or more businesses within the visible boundaries of a displayed map consistent with an aspect of the invention.

FIG. 5 is a flowchart of an exemplary process for identifying the location of one or more businesses within the visible boundaries of a displayed map according to an implementation consistent with the principles of the invention. As one skilled in the art will appreciate, the process exemplified by FIG. 5 can be implemented in software and stored on a computer-readable memory, such as main memory 330, ROM 340, or storage device 350 of server 220.

Figure 6:
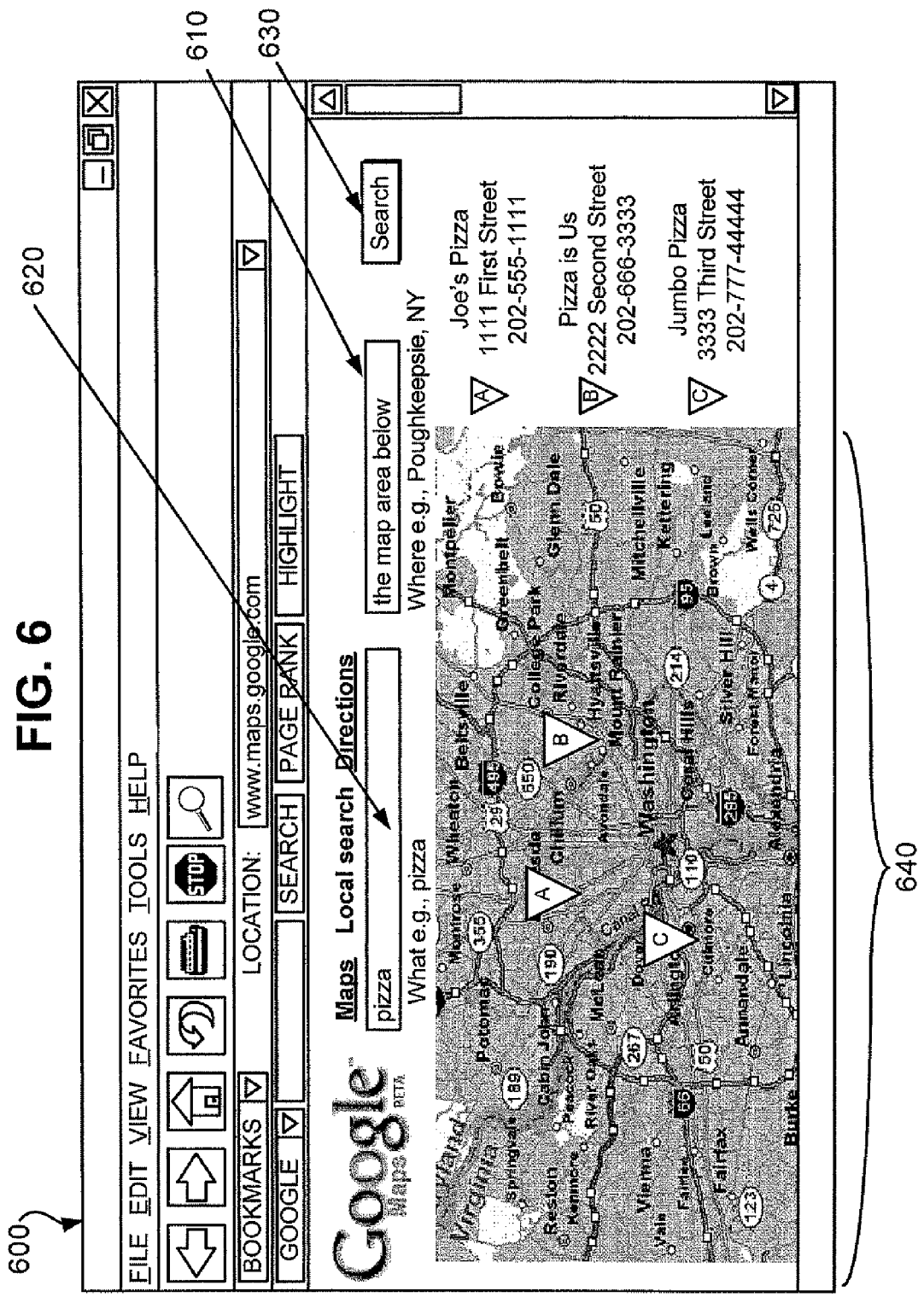
FIG. 6 is a diagram of an exemplary map document consistent with an aspect of the invention.

The exemplary process may begin with providing a map document to a user that includes a selected geographic location (block 500). For example, a user may provide a geographic location, such as, for example, Washington, D.C., to server 220. As shown in FIG. 6, the user may enter a city (e.g., Washington, D.C.) in a location search field 610 of a map document 600. In response, as further shown in FIG. 6, server 220 may update map document 600 to include a zoom level map view 640 of the geographic location selected by the user. Map view 640 may include a default scale that, for example, displays the entirety of a region that encompasses the user provided geographic location (e.g., the areas of Virginia and Maryland that surround Washington, D.C.).

Figure 7:
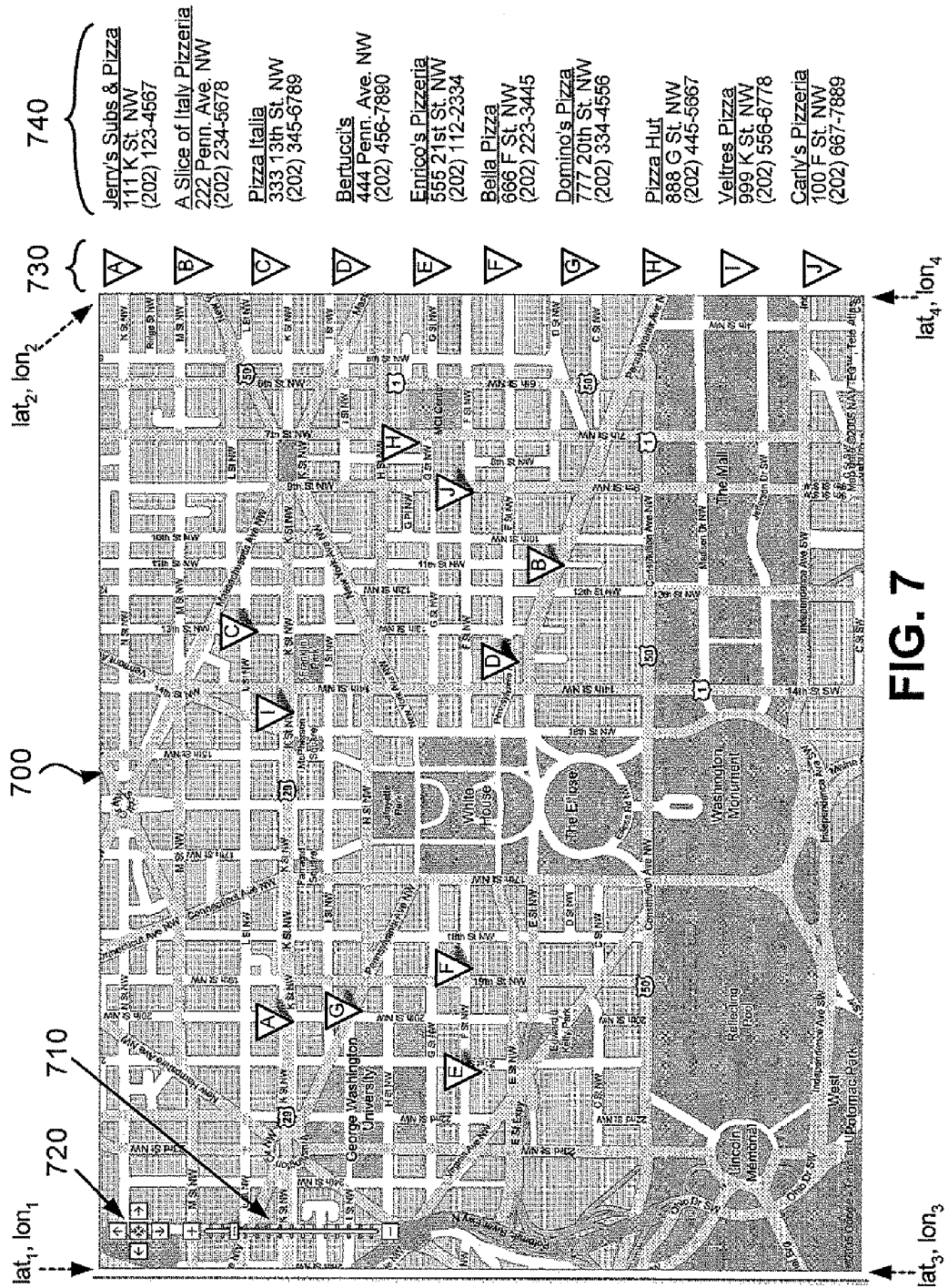
FIG. 7 is a diagram of an exemplary document that includes a zoom level view of the map document of FIG. 6 and identifies businesses located within the zoom level view consistent with an aspect of the invention.

A determination may be made whether the user has re-selected the map boundaries (block 510). The user may re-select the map boundaries by "moving" east, north, south or west of zoom level map view 640, or by "zooming in" or "zooming out" of zoom level map view 640. For example, the user may "zoom in" on the zoom level map view 640 (e.g., by "clicking" on a "zoom in" icon) to produce, as shown in FIG. 7, a small scale zoom level map view 700 of a portion of Washington, D.C. The user may select zoom control 710 (e.g., by "clicking" on a portion of the zoom control icon) to "zoom in" or "zoom out" of map view 700. The user may "move" east, north, south, or west of the zoom level map view 700 by selecting view displacement control 720. If the user has re-selected the map boundaries, then the exemplary process may return to block 500 with the provision of an updated map document to the user that includes the new zoom level map view with re-selected map boundaries.

A search query may be received from the user (block 520). The search query may specify the type of business that the user desires to display within zoom level map view 700. For example, as shown in FIG. 6, the user may enter a business type (e.g., pizza, coffee, groceries, etc.) in search field 620 of a map document 600 and may then select a search button 630.

The boundaries of the zoom level map view may be identified as the geographic search area (block 530). For example, the area defined by the latitude and longitude (lat, lon) corresponding to each corner of zoom level map view 700 may be used as the geographic search area. As a specific example, the upper corner of a zoom level map view may be at latitude 37.557800 and longitude −122.276031 and the lower corner of the zoom level map view may be at latitude 38.557800 and longitude −123.276031. In this specific example, the zoom level map view may include a rectangle of height equal to latitude 1 and a width equal to longitude 1.

The indexed business location information (e.g., indexed in block 410 above) may be searched to identify businesses located within the entire geographic search area that are relevant to the search query (block 540). For example, the latitude and longitude coordinates associated with each indexed business that is determined to be relevant to the search query may be compared with the latitudes and longitudes associated with the geographic search area. As a result of this comparison, businesses that lie within the geographic search area may be identified.

The identified businesses may then be ranked (block 550). The identified business may be ranked using various scoring techniques. For example, in one implementation, the prominence score optionally determined for each business in block 420 above may be used to rank the identified businesses. Other techniques, however, may be used for ranking the identified businesses, such as, for example, ranking the identified businesses based on their proximity to one or more geographic locations (e.g., a business closer to a specific geographic location may be ranked higher than a business that is farther from the specific geographic location). The ranked identified businesses may be provided to the user (block 560). As shown in FIG. 7, a ranked list of businesses 740 may be provided to the user, with each business in the list including a map identifier 730, which visually indicates the location of a business on zoom level map view 700.

CONCLUSION

Systems and methods consistent with the principles of the invention enable the searching of a corpus of location listings, that may have been aggregated from multiple documents hosted at multiple distributed locations in a network, using a graphical interface that provides a map view to a user. Using the graphical interface, a user may search the corpus of location listings to identify entities, such as businesses, that are the most relevant to a given search query and that are located within an entire area of a map view presented to the user. The user may "zoom in," "zoom out," or traverse north, south, east or west with respect to a given map view to change the outer boundaries of the map view, thus, altering the extent of the geographic region over which entities are searched.

The foregoing description of preferred embodiments of the present invention provides illustration and description, but is not intended to be exhaustive or to limit the invention to the precise form disclosed. Modifications and variations are possible in light of the above teachings, or may be acquired from practice of the invention. For example, while series of acts have been described with regard to FIGS. 4 and 5, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects have been described without reference to the specific software code, it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further the phrase "based on" is intended to mean "based, at least in part, on" unless explicitly stated otherwise.

What is claimed is:

1. A system, comprising:
   an interface to receive input from a user via a network; and
   a processor to:
   define a first geographic region associated with a digital map based on first user input,
   search business location information to identify a first set of businesses located within an entirety of the first geographic region,
   define a second geographic region associated with the digital map based on second user input, where the second geographic region is defined by at least one of zooming in or zooming out of the digital map or traversing north, south, east or west with respect to the digital map to define the second geographic region, and
   automatically search the business location information to identify a second set of businesses located within an entirety of the second geographic region in response to defining the second geographic region.

2. The system of claim 1, where the processor is further to:
   provide a list of the identified second set of businesses to the user at a same time as providing a second digital map that depicts the second geographic region.

3. The system of claim 1, where the first geographic region has a first scale and where the second geographic region has a second scale that is different than the first scale.

4. The system of claim 1, where the first geographic region is centered on a first geographic location and the second geographic region is centered on a second, different geographic location.

5. The system of claim 1, where the processor is further to:
   aggregate the business location information from a plurality of distributed documents.

6. The system of claim 5, where the processor is further to:
   indexing the aggregated business location information.

7. The method of claim 6, where the processor is further to:
   search the indexed business location information to identify the second set of businesses located within the entirety of the second geographic region.

8. A computer-readable memory device containing instructions for controlling at least one processor to perform a method, the method comprising:
   aggregating entity location information from a plurality of documents distributed among a plurality of locations in a network;
   searching the entity location information to identify a first set of entities located within an entirety of a first geographic region selected by a user;
   providing a first digital map to the user via the network, the first digital map covering the first geographic region and including visual representations of the identified first set of entities and their associated geographic locations;
   receiving a selection from the user that identifies a second geographic region in response to the user interacting with the first digital map, where the selection includes at least one of zooming in or zooming out of the first digital map or traversing north, south, east or west with respect to the first digital map to identify the second geographic region;

automatically searching the entity location information to identify a second set of entities located within an entirety of the second geographic region in response to receiving the selection; and providing a second digital map to the user via the network, the second digital map encompassing the second geographic region and including visual representations of the identified second set of entities and their associated geographic locations.

9. The computer-readable memory device of claim 8, where the entities comprise one or more of businesses, private residences, or government offices.

10. The computer-readable memory device of claim 8, where the method further comprises:

identifying latitude and longitude information that corresponds to the first and second geographic regions.

11. The computer-readable memory device of claim 10, where searching the entity location information comprises:

comparing latitude and longitude information associated with the entity location information with the latitude and longitude information that corresponds to the first and second geographic regions to identify the first set of entities located within the entirety of the first geographic region and the second set of entities located within the entirety of the second geographic region.

12. The computer-readable memory device of claim 8, where the aggregated entity location information is indexed.

13. The computer-readable memory device of claim 12, where searching the entity location information comprises:

searching the indexed entity location information to identify entities located within the first and second geographic regions.

14. The computer-readable memory device of claim 8, where the method further comprises:

ranking the identified entities located within the first geographic region, and ranking the identified entities located within the second geographic region, where providing the first and second digital maps to the user comprises:

providing the ranked identified entities to the user.

15. A computer-implemented system, comprising:

means for aggregating entity location information from a plurality of documents distributed among a plurality of locations in a network;

means for searching the entity location information to identify a first set of entities located within an entirety of a first geographic region selected by a user;

means for providing a first digital map to the user via the network, the first digital map covering the first geographic region and including visual representations of the identified first set of entities and their associated geographic locations;

means for receiving a selection from the user that identifies a second geographic region in response to the user interacting with the first digital map, where the selection includes at least one of zooming in or zooming out of the first digital map or traversing north, south, east or west with respect to the first digital map to identify the second geographic region;

means for automatically searching the entity location information to identify a second set of entities located within an entirety of the second geographic region in response to receiving the selection; and means for providing a second digital map to the user via the network, the second digital map encompassing the second geographic region and including visual representations of the identified second set of entities and their associated geographic locations.

16. The system of claim 15, further comprising:

means for identifying latitude and longitude information that corresponds to the first and second geographic regions.

17. The system of claim 16, where the means for searching the entity location information comprises:

means for comparing latitude and longitude information associated with the entity location information with the latitude and longitude information that corresponds to the first and second geographic regions to identify the first set of entities located within the entirety of the first geographic region and the second set of entities located within the entirety of the second geographic region.

18. The system of claim 15, where the aggregated entity location information is indexed.

19. The system of claim 18, where the means for searching the entity location information comprises:

means for searching the indexed entity location information to identify entities located within the first and second geographic regions.

20. The system of claim 15, further comprising:

means for ranking the identified entities located within the first geographic region, and means for ranking the identified entities located within the second geographic region, where means for providing the first and second digital maps to the user comprises:

means for providing the ranked identified entities to the user.

* * * * *